United States Patent [19]
Biliunas et al.

[11] 3,964,201
[45] June 22, 1976

[54] FISH BAIT DEVICE AND METHOD

[76] Inventors: Leo Biliunas, 926 Hickory Lane, Darien, Ill. 60559; Allan SunPano, 4101 W. Parker St., Chicago, Ill. 60639

[22] Filed: Mar. 28, 1975

[21] Appl. No.: 562,908

[52] U.S. Cl. ........................................................ 43/4
[51] Int. Cl.² ................................................ A01K 97/04
[58] Field of Search ...................... 43/1, 4, 4.5, 54.5, 43/55; 222/249, 250; 221/2, 27, 28, 29, 175, 279, 312; 425/286

[56] References Cited
UNITED STATES PATENTS

| | | | |
|---|---|---|---|
| 866,079 | 9/1907 | Smith | 425/286 |
| 2,846,803 | 8/1958 | Rettig | 43/4 |

*Primary Examiner*—Warner H. Camp
*Attorney, Agent, or Firm*—Dawson, Tilton, Fallon & Lungmus

[57] ABSTRACT

A device and method for baiting fishhooks wherein a tubular member receives a quantity of fish bait having a dough-like consistency to provide a plug, a fishhook being inserted into said plug and thereafter a plunger on said tubular member being actuated to simultaneously expel said plug and hook.

1 Claim, 9 Drawing Figures

FISH BAIT DEVICE AND METHOD

BACKGROUND AND SUMMARY OF INVENTION

This invention relates to a fish bait device and, more particularly, a device which not only provides the bait but installs the same on the fishhook. Two principle problems have faced fishermen over the years — providing the right amount of bait and installing it on a hook. The latter problem is probably more poignant in most fishermen's minds inasmuch as almost every beginner has been stuck by a fishhook. However, the other problem is not far behind because a variety of baits are available, i.e., worms, insects, food in general and the whole gamut of artificial lures. No single approach in the past has made it possible for the novice fisherman, or, for that matter, the expert, to have the right amount of bait and to have it installed on a hook simultaneously. These twin goals have been achieved according to the invention.

In the invention, a tubular device is employed which has a plunger reciprocable therein so as to extract a predetermined amount of fish food, i.e., bait from a container holding bait of a dough-like consistency. Thereafter, the hook it introduced into the ensleeved plug and with the single step of expelling the plug, the hook is likewise expelled and in condition for immediate fishing.

Other objects and advantages of the invention may be seen in the details of the invention as set forth in the ensuing specification.

DETAILED DESCRIPTION

The invention is described in conjunction with the accompanying drawing, in which —

Figure 1:
FIG. 1 is a perspective view of the inventive device shown being inserted into a container of dough-like fish food.
Figure 5:
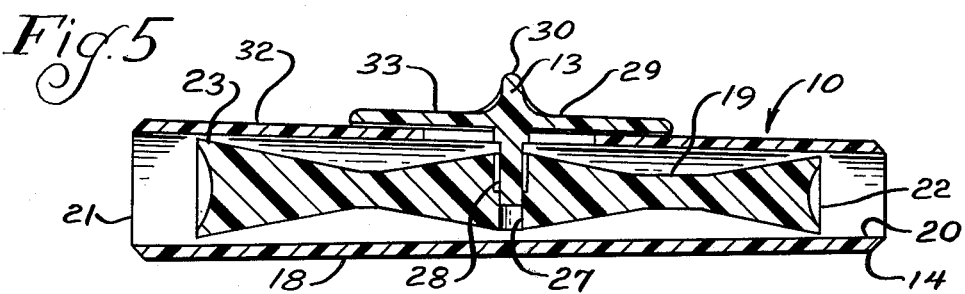
FIG. 5 is a longitudinal sectional view of the inventive fishhook baiting device.
Figure 8:
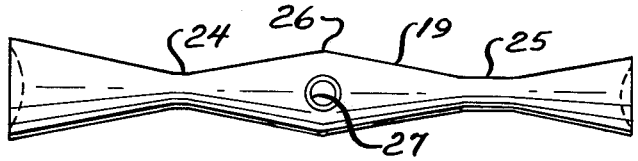
Figure 9:
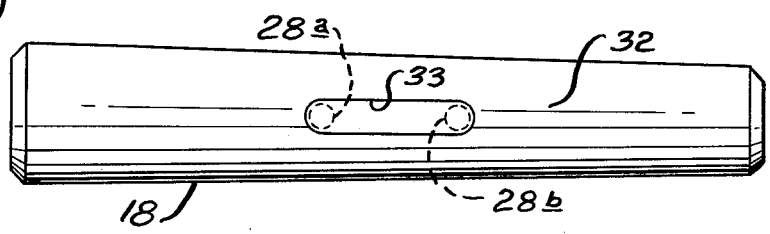

FIG. 8 is a top plan view of the plunger portion of the tubular device, being seen in the central portion of FIG. 5 as well; and FIG. 9 is a top plan view of the tubular housing of the inventive device. In the illustration given and with reference first to FIG. 1, the numeral 10 designates generally the inventive fishhook baiting device which is seen in the process of being inserted — see the arrow designated 11 — into a container housing fish bait. Advantageously, the fish bait is of a dough-like consistency and can be housed in any suitable container such as that designated 12. At this point in time, the thumb piece 13 is suitably retracted, i.e., positioned as far toward the uninserted end as possible. This provides a space in the inserted end for the receipt of the bait.

Figure 2:
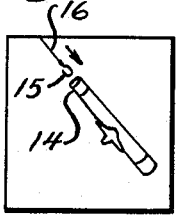
FIG. 2 is a fragmentary perspective view showing the device positioned to receive a fishhook.
Figure 3:
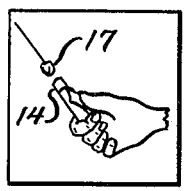
FIG. 3 is a view similar to FIG. 2 but showing a subsequent step in the inventive procedure, i.e., the step of simultaneously expelling the plug of fish food with the hook embedded therein.
Figure 4:
FIG. 4 illustrates the plug having the hook embedded therein being held in the hand of a fisherman.

After bait has been received within the end previously inserted — the end being designated 14 in FIG. 2, a hook 15 suitably attached to a line 16 is inserted into the plug of dough housed within the device 10 — the plug being designated 17 in FIG. 3. To proceed from the showing in FIG. 2 to that of FIG. 3, the thumb piece 13 is moved longitudinally toward the end 14 so as to simultaneously expel the plug of bait with the hook embedded therein. This results in the assembly of elements designated 17' and further illustrated in FIG. 4.

The device 10 (now referring to FIG. 5) includes a tubular element 18 in which is reciprocably positioned the plunger 19. In turn, the plunger 19 is connected to the thumb piece 13. In the illustration given, the tubular member 18 is open at both ends but has a tapered bore 20. The bore 20 adjacent the end 14 has a diameter of approximately ½ inch while at the other end, designated 21, the bore 20 has a diameter of about ¾ inch. The plunger 19 has a reduced diameter end 22 to coincide generally within the bore 20 at the end 14 while, at its other end as at 23, the diameter is somewhat larger — so as to substantially fill the bore 20 at the end 21. As can be appreciated from FIG. 8, the plunger 19 has a generally circular cross-section but of varying diameter throughout its length which saves on material by having neck down areas as at 24 and 25. Intermediate the ends of the plunger 19 an enlarged portion is provided as at 26 which contains a transverse bore 27. The bore 27, as can be appreciated from FIG. 5, receives an integral post portion 28 (see also FIG. 6) provided on the thumb piece 13. The post 28 is adapted to be received as by a press fit within the transverse bore 27.

Figure 6:
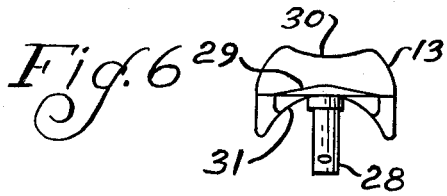
FIG. 6 is an end view of the thumb manipulatable plunger piece also seen at the extreme top center of FIG. 5.
Figure 7:
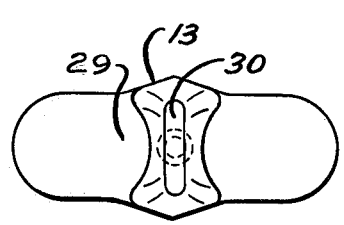
FIG. 7 is a top plan view of the aforementioned thumb manipulatable plunger piece.

Referring to FIGS. 5–7, it will be seen that the thumb piece 13, in the illustration given, is shaped to conform to the user's thumb for use in whichever direction the plunger 19 is desired to be moved. In other words, the upper surface as at 29 is curved upwardly adjacent the central portion 30 so as to develop convenient thumb pressing areas. The upper surface 29 is also arcuately curved (as in transverse section) as can be seen particularly from FIG. 6 in the area designated 31 so as to conform generally to the outer surface 32 of the tubular member 18. The tubular member 18 — as best seen in FIG. 9 — is equipped in its top surface with a longitudinally elongated slot 33 (see also FIG. 5) through which the post 28 of the thumb piece 13 extends.

In the operation of the invention, the thumb piece (for the sequence of steps depicted in FIGS. 1–4) — is positioned so that the post 28 is essentially in the position designated 28a in FIG. 9. This means that the plunger 19 is retracted relative to the end 14, i.e., the plunger end 22 is sufficiently removed from the end 14 so as to permit a suitable plug to be developed in that end of the tubular member. After the material constituting the bait has been received within the bore and the hook 15 inserted into that plug (in the fashion illustrated in FIG. 2), the thumb piece 13 is moved to the dotted line position designated 28b in FIG. 9 so as to expel the plug 17 in the fashion illustrated in FIG. 3.

It will be appreciated that in some instances only a single open ended member may be provided if only a single size of bait plug is desired. Also, it is within the purview of the invention to provide assemblies for different sizes. For example, in addition to the illustrated embodiment which has bores of ½ and ¾ inches at the two ends — this being over a 5 foot length, another preferred embodiment also utilizes a 5 foot length but with the smaller bore measuring about 3/16 inch in diameter while the larger bore is approximately ⅜ inch in diameter. In either case, the plunger 19 has a length of about 4 inches so as to develop an approximately 4 inch long plug. In like fashion, the length of the slot 33 is approximately 1 inch.

While in the foregoing specification, an illustrative embodiment of the invention has been set down in detail for the purpose of explaining the same, many variations of the details hereingiven may be made by those skilled in the art without departing from the spirit and scope of the invention.

We claim:

1. A device for baiting fishhooks comprising a relatively elongated tubular member having at least one open end, a plunger mounted in said member for slidable movement longitudinally thereof from a first position removed from said one end to adapt said tubular member to receive fish bait dough to a second position adjacent said one end for ejecting said fish bait dough, an opening in said tubular member, and finger manipulatable means on said plunger extending through said opening, said tubular member being open at both ends and having a tapered bore extending from one end to the other to produce dough plugs of different diameters, said opening being an elongated slot positioned midway the length of said member to adapt said plunger and finger means to move toward both tubular ends.

* * * * *